(12) United States Patent
Casais

(10) Patent No.: US 6,941,337 B2
(45) Date of Patent: Sep. 6, 2005

(54) INTERACTION ARRANGEMENT FOR A SEQUENCE OF INTERACTIONS PROVIDING A SERVICE TO A USER

(75) Inventor: Eduardo Casais, Espoo (FI)

(73) Assignee: Nokia Corporation, Espoo (FI)

( * ) Notice: Subject to any disclaimer, the term of this patent is extended or adjusted under 35 U.S.C. 154(b) by 821 days.

(21) Appl. No.: 09/876,560

(22) Filed: Jun. 7, 2001

(65) Prior Publication Data

US 2002/0188661 A1 Dec. 12, 2002

(51) Int. Cl.[7] .............................................. G06F 15/16
(52) U.S. Cl. ..................... 709/202; 719/311
(58) Field of Search ........................ 709/202; 719/311; 712/242; 713/153; 370/310, 317

(56) References Cited

U.S. PATENT DOCUMENTS

| | | |
|---|---|---|
| 5,895,471 A | 4/1999 | King et al. |
| 6,119,155 A | 9/2000 | Rossmann et al. |
| 6,625,274 B1 * | 9/2003 | Hoffpauir et al. ............ 379/229 |
| 2002/0054090 A1 | 5/2002 | Silva et al. |
| 2002/0163544 A1 * | 11/2002 | Baker et al. ................. 345/835 |
| 2002/0176379 A1 * | 11/2002 | Wallenius et al. .......... 370/328 |
| 2003/0095525 A1 * | 5/2003 | Lavin et al. ................. 370/338 |

FOREIGN PATENT DOCUMENTS

| | | |
|---|---|---|
| EP | 1126657 A2 | 8/2001 |
| WO | WO 01/13259 | 2/2001 |
| WO | WO 01/69470 A1 | 9/2001 |

* cited by examiner

*Primary Examiner*—Krisna Lim
(74) *Attorney, Agent, or Firm*—Squire, Sanders & Dempsey LLP

(57) ABSTRACT

This invention relates to interactions when a subscriber requests services from a server. The invention captures a sequence of interactions among a mobile terminal, a network element, and a server. The network element, such as a gateway or proxy, is a transmitting network element with specific tasks between the mobile terminal and the server. The server provides the service that is requested by the subscriber. All these elements form interactions among themselves for performing the request. The sequence of the interactions forms a macro, which can be replayed later.

24 Claims, 4 Drawing Sheets

INTERACTION ARRANGEMENT FOR A SEQUENCE OF INTERACTIONS PROVIDING A SERVICE TO A USER

FIELD OF THE INVENTION

This invention relates to interactions when a subscriber requests services from a server. Especially, the interactions are interactions among a wireless terminal, such as a mobile phone, a network element, such as a gateway or proxy, and a server. An interaction means a communication event, for example, an act of sending or receiving something.

BACKGROUND OF THE INVENTION

In the following, we rely upon the mechanism, formats and facilities provided by the WAP standard at the time of this writing in order to explain the invention. FIG. 1 shows an example of decks 1 to 8 and cards 9 to 22 in the decks. Decks and cards correspond to WWW pages in the Internet. Since the capacity of a mobile phone is restricted, information that can be shown in one page in the Internet must be divided into several parts. At present, sent, WAP phones can process decks whose size ranges approximately from 1400 to 2500 bytes. A deck is a unit which is sent to a mobile terminal, one at a time. The deck contains at least one card, which is a unit that is shown on the display of the mobile terminal one at a time. In this way, it is possible to transmit a great amount of information to the mobile terminal and to show it on the small display of the mobile terminal.

A problem with using the services is that a subscriber must enter data many times. Such data are, for example, name, address, telephone number, user identification, password, product codes etc. FIG. 1 also shows an example of what the subscriber might have to do when he wants to know the weather in the city of Tampere. First, the subscriber selects the right link 23 on his home page—in this case service provider A offers weather forecast services. However, before the subscriber can use the weather forecast service, he must enter his username and password for accessing the services of service provider A. After accessing the services, the subscriber selects the right option among different types of links offered by the service provider. In this case the right link is Services 24. The service link comprises several options, such as news, weather, and sport. The subscriber selects Weather 25. In the weather option he must then select the right geographical area, in this case Europe N 26, i.e. North Europe. After this the subscriber must select the country, in this case Finland 27. The country option comprises cities of the country. The city of Tampere 28 is the desired one in this case. After selecting the city, the subscriber can choose the type of weather forecast he wants to request. In this case, the subscriber selects 3 days forecast 29. After this, the subscriber initiates 30 the request.

As can be noticed, the subscriber must go through the hierarchy of the decks and cards, and entering data or making selections before reaching the actual service he is interested in, This is tedious and consumes time. Repetitive data entries and selections are particularly uncomfortable on wireless terminals with limited keypads, which require pressing a key several times to input a single alphanumeric character. Furthermore, going through the decks and cards consumes limited transmission capacity in the air. The decks are transmitted to the mobile terminal 31 in order from P1 to P8. The goal of the invention is to eliminate these drawbacks. This is achieved in a way described in the claims.

SUMMARY OF THE INVENTION

The idea of the invention is to capture a sequence of interactions among a mobile terminal, a network element, and a server. The network element, such as a gateway or proxy, is a transmitting network element with specific tasks between the mobile terminal and the server. The server provides the service that is requested by the subscriber. All these elements form interactions among themselves for performing the request. In the present invention, the sequence of the interactions is recorded as a macro, which can be replayed later.

Decks and cards, which are sent to the mobile terminal, are enhanced with a switch function, The subscriber turns on the switch on a suitable card to signal his intention of capturing subsequent interactions. When the subscriber wants to finish the capture of the interactions, the subscriber turns the switch off. The sequence of interactions between the switching on and off is stored as a macro on the home page of the subscriber. A URL associated with the macro has been created for accessing the macro. When the subscriber wants to replay the macro, he selects the relevant link (URL) corresponding to the macro on his home page. Since the macro has been stored on the subscriber's home page in the gateway, proxy, or server the macro can communicate directly with the server without any need for the subscriber's intervention. After the last step of the macro has been performed, the control returns to the mobile terminal.

BRIEF DESCRIPTION OF THE DRAWINGS

In the following the invention is described in more detail by means of FIGS. 1–6 in the attached drawings where.

DETAILED DESCRIPTION OF THE INVENTION

Figure 1:
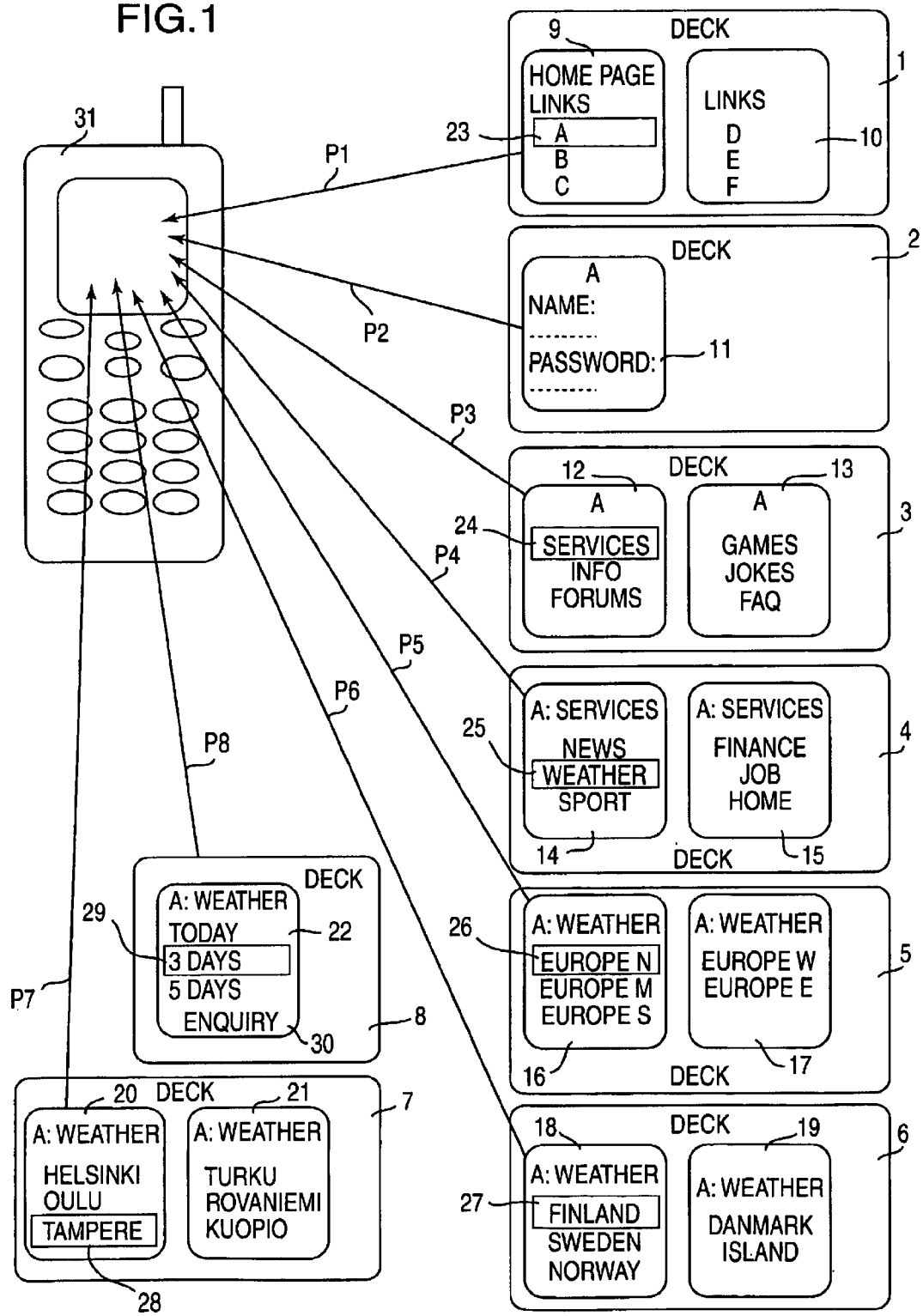
FIG. 1 illustrates an example of decks and cards transmitted to a mobile terminal.
Figure 2:
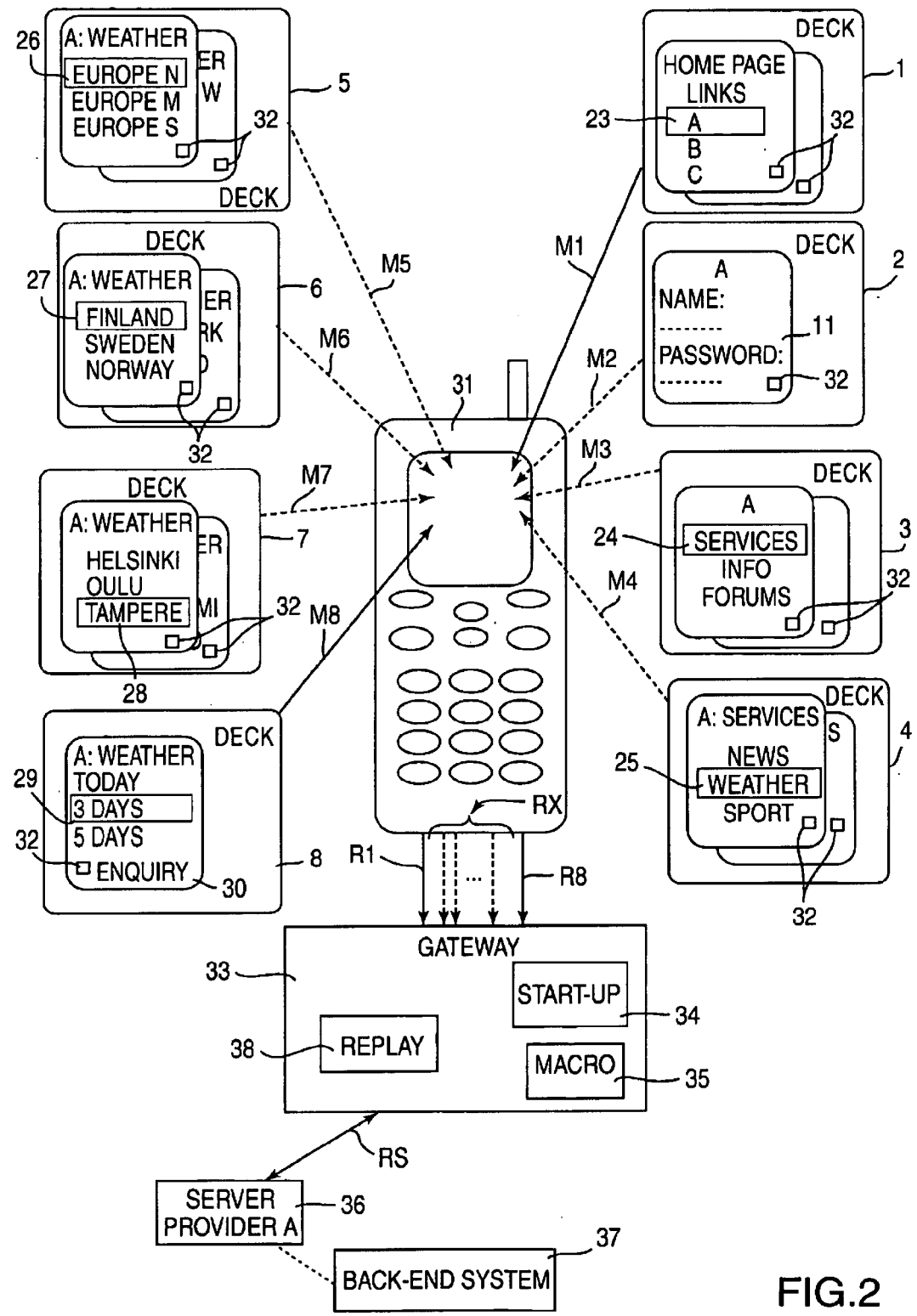
FIG. 2 illustrates an example of the creation of a macro according to the invention.

FIG. 2 shows an example of how a macro is created. The example corresponds to the example illustrated in FIG. 1. The switch function 32 is attached to every card that is sent to the subscriber. When the subscriber wants to start the creation of the macro, he simply turns the function on. The state of the switch can be showed on the display of the mobile terminal as designed, such as changing the filling of a special macro icon, showing a symbol, or just showing ON or OFF. The lines M1 to M8, which describe the delivery of the decks to the terminal, are drawn as solid lines in the case of the decks wherein the subscriber changes the state of the switch function, and as dashed lines in the case of the decks wherein the subscriber's actions are recorded in the macro.

In this case, the subscriber wants on his home page, on the deck, to turn on recording the macro, which was delivered first M1 to the mobile terminal. The subscriber turns the switch function 32 on, and further, selects normally the link to service provider A 23. As a default state the switch function is OFF. After the selection of the link the mobile terminal sends a request R1 for accessing the services of provider A. The request also contains a variable indicating the state of the switch function, now in state ON. The variable has a prefix (a name) for identifying the variable. The variable and prefix are preferably in the URL code sent in the request. The gateway 33 contains a start up element 34 for creating the macro 35 and for recording and replaying the interactions associated with the subscriber. Furthermore, the start-up element creates a URL address for the macro. A suitable URL name is created automatically.

After this, the subscriber makes selections and required data entries in the decks delivered subsequently M2 to M7. He enters his username and password, selects Services 24, Weather 25, Europe N 26, Finland 27, and Tampere 28 through the decks and cards. All interactions are recorded in the macro. It should be noticed that the interactions between the server of the service provider and the gateway resulting from the subscriber's operations are also recorded in the macro. During these phases, the delivered decks and data RX transmitted from the mobile terminal to the gateway contains the information of the ON state. The start up element 34 checks what the state of the switch function is from every received request from the mobile terminal. Until finally, on the delivered deck M8 wherein the subscriber wants to finish the macro, the subscriber turns the switch function 32 OFF, selects 3 days weather forecast 29 and initiates 30 the request. The mobile terminal sends a request R8 for getting the weather forecast. The request also contains a URL code containing a variable indicating the state of the switch function, now in state OFF. The last request from the mobile terminal is recorded in the macro. As can be noticed, the subscriber must enter data forms and make selections, such as turning the switch function to the desired state, before sending any request to the gateway. The gateway continues the normal operation for sending the request of the weather forecast forward to the server of the provider 36.

Before the gateway continues its operations normally, after the macro has stopped recording, it is optional that the start up element can request from the subscriber if he wants to change the name of the macro's URL address, which was created automatically. The start up element sends the request to the mobile terminal, and the subscriber can enter a name he desires. The start up element also creates a link of the macro's URL address on the subscriber's home page, with the name desired.

The request or session handling module of a gateway is a preferable place for the start-up element. Besides activating the creation of a macro and watching requests from a mobile terminal, the start-up module adds the switch function into cards of decks and modifies requests inside WML (Wireless Markup Language) decks. These can be achieved by splicing appropriate constructions into the DOM (Document Object Model) tree representing the WML document. The splicing can be done via special-purpose programs or via any XSLT (XML Stylesheet Language Transformation) transformation. Modifying URL and HTTP fields that terminate the context for the requests and responses can be done via simple filters.

WML (Wireless Markup Language) is a markup language based on XML (Extensible Markup Language), and is intended for use in specifying content and user interface for narrowband devices, including cellular phones and pagers. XML is the universal format for structured documents and data on the Web. DOM is a platform- and language-neutral interface that will allow programs and scripts to dynamically access and update the content, structure and style of documents. XSLT is a language for transforming XML documents into other XML documents.

The macro 35 is stored in a configuration file or a database. The storing element is preferably in the same site as the subscriber's home page. Gateways, servers, and proxies are suitable locations for storing the macro. In FIG. 2 the macro is stored in the gateway, but as well the macro could be stored in the server 36 or in the back-end system 37 of the server.

Figure 3:
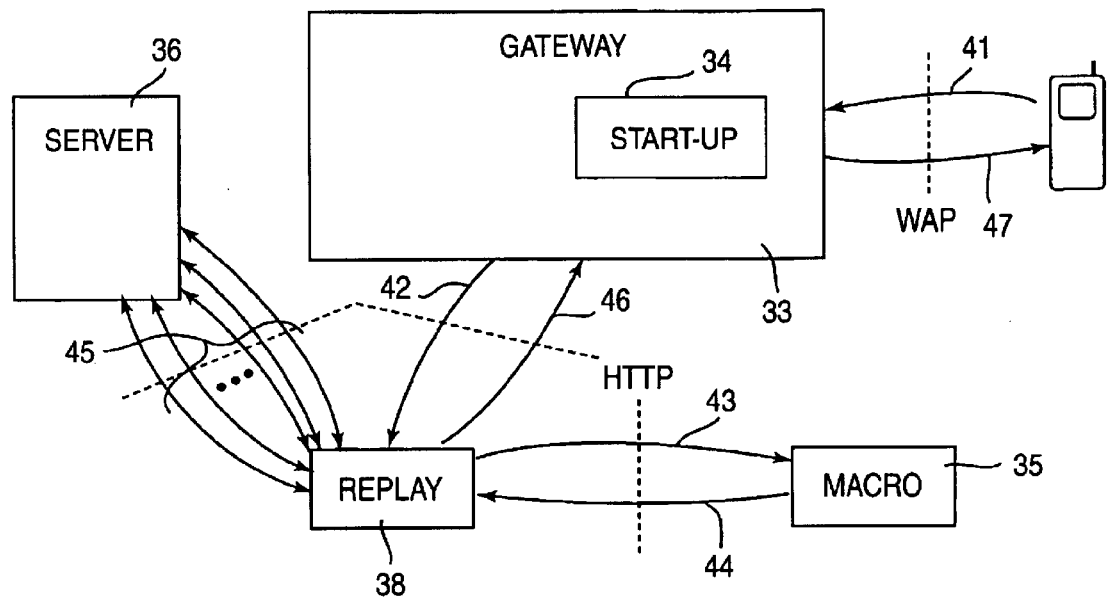
FIG. 3 illustrates an example of interactions during replaying a macro.

FIG. 2 also shows a replay element 38, which can be a Java™ servlet. A servlet can almost be thought of as an applet that runs on the server side. An applet is a program, also written in the Java™ programming language, that can be included in an HTML page (or in a card or deck); in contrast, a servlet is a program that is running in the context of a server, proxy, or gateway. The replay element reads macros and replays them. FIG. 3 illustrates an example of interactions for reading and replaying a macro. The subscriber selects the desired link on his homepage, and the request is sent 41 to the gateway, In the gateway, the start-up element checks the state of the switch-function as mentioned before, since the gateway has attached it to the decks and cards sent to the mobile terminal of the subscriber. After this, the gateway performs normal functions for handling and forwarding the request.

The gateway recognizes from the request that it concerns macros and due to this information directs the request 42 to the replay element in charge of handling macros according to the invention. The replay element extracts the parameters attached to the URL of the request, and finds out the identity of the file or database entry where the macro is stored. The replay element contacts 43 the macro and reads out 44 the macro for replaying it. The replay element constructs a valid request for the server out of the macro. In other words, the element extracts HTTP fields needed to identify the subscriber's request, the destination—i.e. the entity of the server—of the request, and the data associated with the request; in WAP, this typically consists of the HTTP method, the URL, and other fields from the HTTP header. Furthermore, other HTTP fields needed to form the request are also extracted, possibly from the request of the subscriber that has activated the replay of the macro. As an example, the information about the device used by the subscriber (such as the phone model) is added to the request constructed from the macro. The replay element sends the constructed request to the server, and gets a response back from the server.

The response of the application server is checked to determine whether it contains errors. It the error/errors are fatal, the macro is aborted and a suitable error message is formed and sent to the subscriber. Otherwise the replay element constructs the next request, merging in the information of the response previously returned by the server when appropriate (for example, in the case of cookies returned by the server). The reconstructed requests are sent 45 in turn to the server until the response for the final request is received in the element. The response for the customer's request is complete and is sent 46 to the gateway. The gateway delivers 47 the response to the subscriber. It should be noted that it is also possible that, if the request contains only a new URL address to the next page and no additional interaction is required between the gateway and the server (such as the server returning HTTP cookies), this kind of request may be skipped and the request for the last URL address can be constructed. However, requests to fill forms, such as passwords, names etc., always have to be carried out.

It is worth noting that the information stored in a macro can be a complete executable or interpretable script. When storing the macro, the start-up element in the gateway generates a code that actually issues the requests and handles responses. Naturally, when the script is invoked in the replay element, one must pass substantial context information for issuing complete requests to the application server.

As can be noticed in FIG. 3, the transmission way between the mobile terminal and the gateway is based on a WAP protocol, or another wireless environment protocol, and the transmission ways among the gateway, macro, replay element, and the application server are based on an HTTP protocol, or another protocol used in fixed networks. Furthermore, the content transmitted to the subscriber may be WML, or any other content format used in the Internet (such as XHTML, HTML, or any other markup language).

Figure 4:
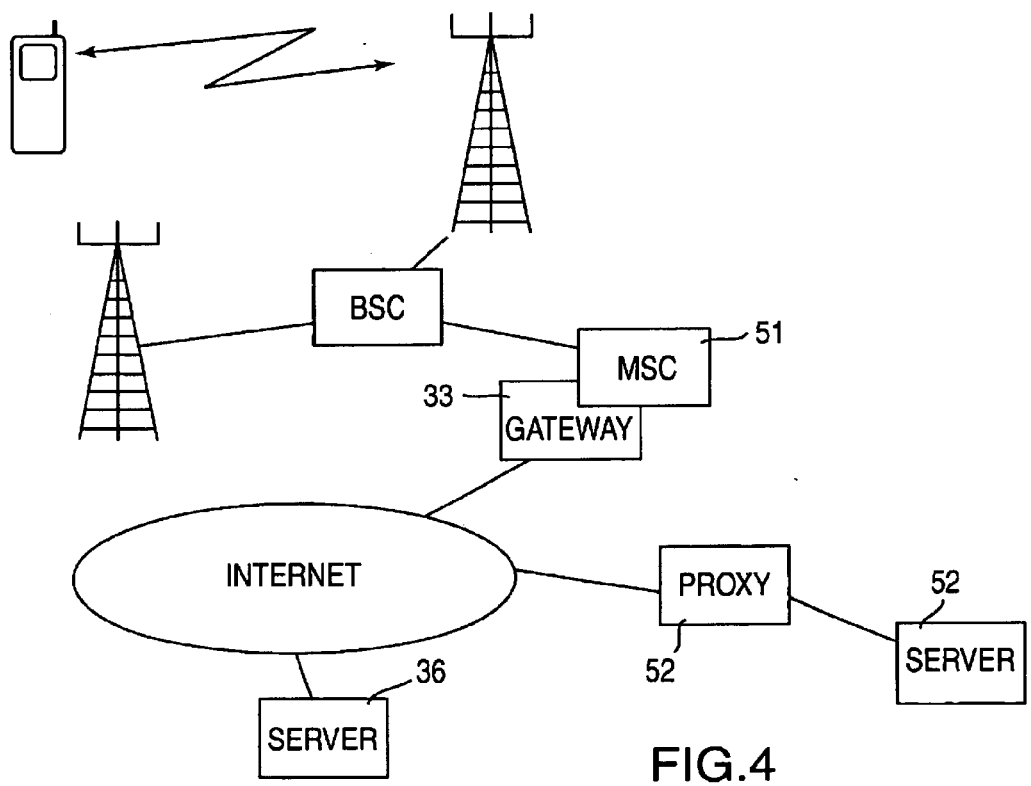
FIG. 4 illustrates an example of a network structure.

Although the replay element and the macro have been shown as separate elements from the gateway in FIG. 3, the macro and replay element can be situated in any suitable place in the network. FIG. 4 shows an example of a simplified network structure. Usually, the gateway 33 is situated in the same site with a MSC (Mobile Switching Center) 51. The gateway performs the interface between the protocols of the wireless environment and the fixed network, such as the Internet. The Internet comprises application servers and proxies. So, natural places for the macro and the replaying element are gateways 33, servers 36, and proxies 52.

As can be seen, the interaction arrangement according to the invention also saves limited air transmission capacity, since most communications resulting from interactions needed for performing the request take place between the application server and the replay element in the fixed network.

During the capture of a macro and its replay it, the gateway must be able to associate requests and responses to the subscriber's terminal unambiguously, i.e. identifying all interactions belonging to the subscriber's original request. This can be achieved in many ways, such as relying upon the implicit identification of a series of requests afforded by a connection-oriented mode of communication, by exchanging cookies, or by using the identification information of the mobile terminal itself (such as its MSISDN).

Figure 5:
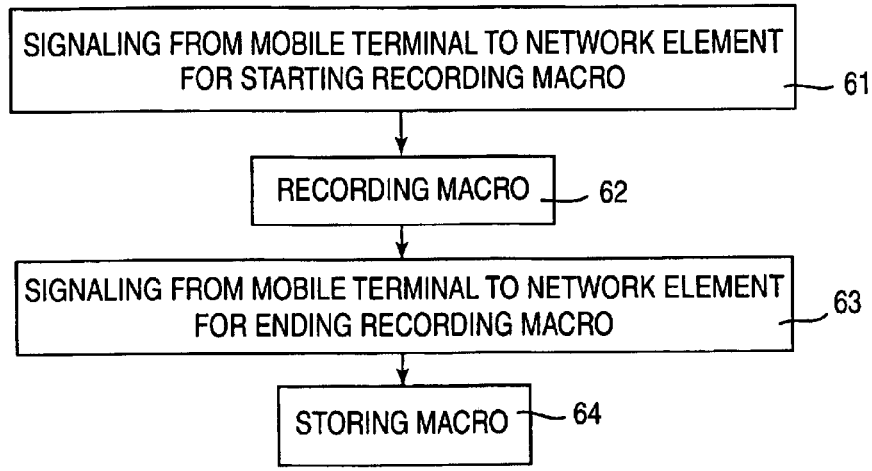
FIG. 5 illustrates an example of a method for creating a macro according to the invention.

FIG. 5 shows an example of a method for creating a macro according to the invention. First, when the subscriber turns the switch function ON, the mobile terminal signals 61 this state information of the switch with the next request sent to the gateway for creating the macro. The start-up element in the gateway starts creating the macro by creating and initializing suitable data structures in a data repository for the macro, and by recording interactions related to the subscriber's terminal 62. When the subscriber turns the switch function OFF, the mobile terminal signals 63 this state information of the switch with the next request sent to the gateway for ending recording the macro. The interaction of the last request is recorded for the macro, and the macro is stored 64 in the data repository, such as a configuration file or database.

Figure 6:
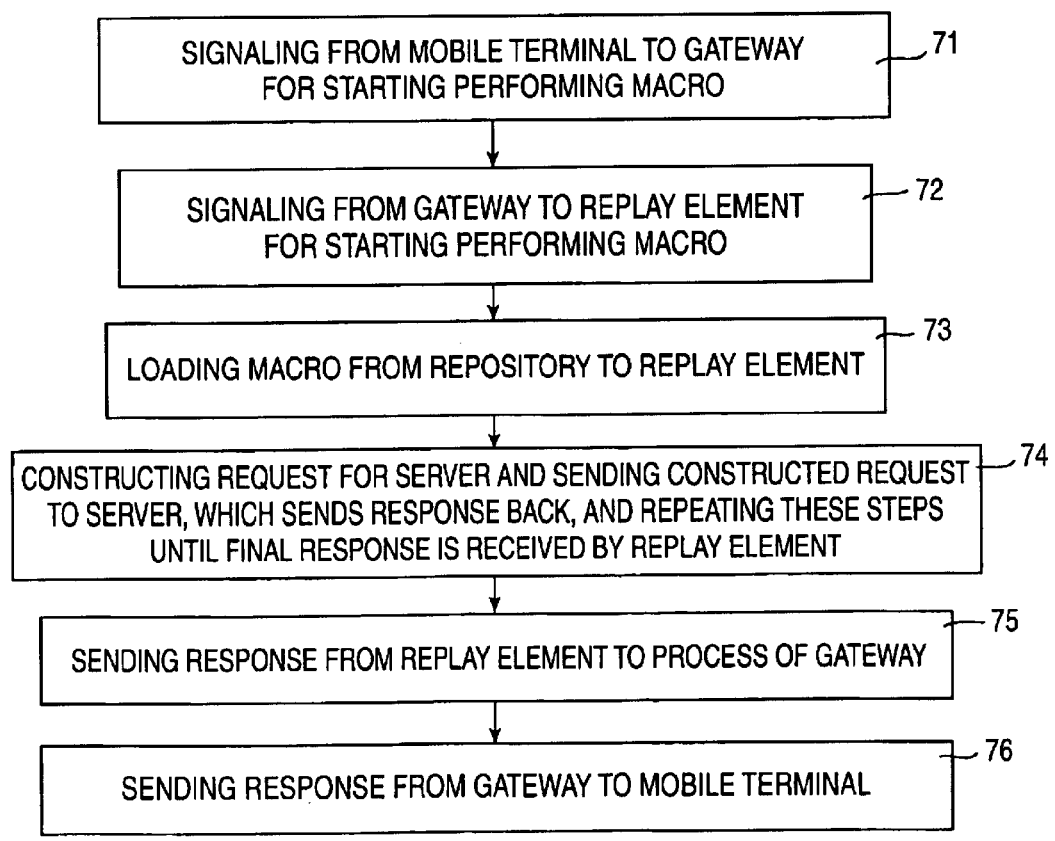
FIG. 6 illustrates an example of a method for replaying a macro according to the invention.

FIG. 6 shows an example of a method for replaying a macro according to the invention. When the subscriber selects a link of a macro on his mobile terminal's display, the mobile terminal signals 71 the information of this selection to the gateway. The gateway signals 72 this information to the replay element in turn. As mentioned, the replay element can also be in the gateway. The replay element loads 73 the macro from the data repository and begins to construct 74 a request for the server, which handles the application of the service desired. The replay element also sends the constructed request to the server, which sends back a response to the request. If the request does not contain a fatal error, the replay element constructs the next request and repeats these steps until a final response for the last constructed request is received. As mentioned before, the intermediate URL addresses may be skipped when constructing the request, provided there is no additional interaction taking place between the gateway and the server. The replay element sends 75 a response for the subscriber's request to the process of the gateway, which converts the response for the wireless environment, if necessary, and sends 76 it to the subscriber's terminal.

In comparing a macro according to the invention to known solutions to solve the problem of long and tedious data entry, it is possible to define how the inventive macro differs from the known solutions: bookmarks, single sign-on, form filling, and keyboard macros. Bookmarks make it possible for users to jump directly to the right WWW-page without browsing through other pages. When a user enters his username and password for getting in to use services, a proxy of the services stores and remembers the username and password; the user can browse pages of the services with a single sign-on, without re-entering this information all over again whenever accessing a WWW-site requiring authentication, By filling standard profile forms (such as name, address and credit card number), users do not need to enter the information belonging to the forms again, when they access pages that ask the same information, for example name. Keyboard macros record the exact sequence of keypad operations, including cursor movements and mouse operations.

Macros according to the invention differ from the above-mentioned solutions. First an inventive macro is applicable to any kind of an interaction between a mobile terminal and an application—selecting a link and filling in a form. So it comprises the functionality of bookmarks and single sign-on. Contrarily to keyboard macros, the invention does not apply to the exact interactions with the user-interface on the terminal itself. Instead, the invention applies to the interactions among the terminal and the application, and thus abstracts out the user interface issues specific to a terminal. Hence, it is possible to use the same macro with terminals relying upon different entry methods (for example keypad versus pen).

The invention records exactly what the user wants to achieve. Contrarily to form-filling modules, it does not try to interpret incoming pages to figure out whether they might be filled in automatically with pre-recorded data.

It is intended to provide a suitable macro for the use of a wireless terminal with limited user input capabilities. Wireless applications must be decomposed into a fairly long succession of hierarchical decks that users must traverse before reaching the actual services they are interested in. Applications themselves may require a user to fill in several forms along the path traversed. Since a form must be filled in the correct order, it is generally impossible to jump (via a bookmark) to the final deck.

Thus, the interaction arrangement according to the invention captures a sequence of interactions with a wireless application, and replays them later on. No additional software or storage is needed on a mobile terminal. Standard browsers can be used. The invention can be used in any wireless environment, such as WAP, but it is applicable to a traditional WWW environment too. Thus it is evident that the interaction arrangement according to the invention can be implemented in many other ways than described above, in the scope of the inventive idea.

What is claimed is:

1. An interaction arrangement for a sequence of interactions providing a desired service to a user of a terminal, the arrangement comprising:
   a server for the service, the server being connected via a fixed network to a gateway providing an interface between the fixed network and a mobile network through which the terminal is connected to the gateway;
   a start-up element for creating a macro for the sequence of interactions; and
   a replay element for replaying the macro for the desired service wherein the start-up element is configured to add a switch function to pages incoming from the fixed network and, before the pages are sent to the terminal, a state of the switch function indicating when the creation of the macro starts and ends and when interactions are recorded for the macro.

2. An arrangement according to claim 1, wherein the start-up element is configured to start recording interaction into the macro when receiving a message from the terminal containing the state of the switch function indicating to start, to give a URL address for the macro, and to create a place for storing the macro, the recording of interactions being continued until receipt by the start-up element of a message containing the state of switch function indicative that the recording is to be ended.

3. An arrangement according to claim 2, wherein the start-up element is configured to strip the switch function from messages coming from the terminal before the messages are forwarded to the server.

4. An arrangement according to claim 3, wherein the start-up element is configured to, record interactions belonging to a message containing the end state information, and to store the macro in the storage place when the state of a switch function indicates that the recording is to be ended.

5. An arrangement according to claim 4, wherein the start-up element is configured to add a link for the macro on the user's home page.

6. An arrangement according to claim 5, wherein the start-up element is configured to ask for a name to the link from the user before storing the macro.

7. An arrangement according to claim 5, wherein the replay element is configured to play the macro when receiving a signal from the terminal indicating that the macro is to be performed.

8. An arrangement according to claim 7, wherein the replay element is configured to load the macro from the storage place and to interact with the server.

9. An arrangement according to claim 8, wherein the replay element is configured to send a response to the terminal through the gateway after the macro is played.

10. An arrangement according to claim 9, wherein the storage place of the macro is situated in the gateway.

11. An arrangement according to claim 9, wherein the storage place of the macro is situated in the server.

12. An arrangement according to claim 9, wherein the storage place of the macro is situated in a proxy in the fixed network.

13. An arrangement according to claim 9, wherein the replay element is situated in the gateway.

14. An arrangement according to claim 9, wherein the replay element is situated in the server.

15. An arrangement according to claim 9, wherein the replay element is situated in a proxy in the fixed network.

16. A method for a sequence of interactions providing a desired service to a user of a terminal, which service is situated in a server for the service, the server being connected via a fixed network to a gateway, which performs an interface between the fixed network and a mobile network through which the terminal is connected to the gateway, the method comprising:
   signaling from the terminal to the gateway for creating a macro for the sequence of interactions;
   establishing a data structure for the macro in a data repository;
   recording the interactions for the macro;
   signaling from the terminal to the gateway for ending recording; and
   storing the macro in the data repository, wherein for replaying the macro, the method comprises
   signaling from the terminal to the gateway for starting performing the macro,
   signaling from the gateway to a replay element for starting performing the macro,
   loading the macro from the data repository to the replay element,
   constructing a request for the server,
   sending the request to the server,
   receiving a response from the server in the replay element,
   for a next request repeating the constructing, sending, and receiving of a response, until finally a response for the final request is received, and
   sending a response for performing the macro to the terminal.

17. A method according to claim 16, wherein establishing of the data structure comprises creating automatically an identification for the macro, which is shown on the terminal.

18. A method according to claim 17, wherein, before the macro is stored into the data repository, for changing the automatically created identification to an identification desired by a user of the terminal, the method further comprises:
   sending a request to the terminal for asking a new identification for the macro; and
   as a response to the request, signaling the new identification from the terminal to the gateway.

19. A method according to claim 16, wherein the constructing of the request comprises reading the stored interactions in the macro.

20. A method according to claim 16, further comprising:
   sending the response to the terminal via the gateway.

21. An interaction arrangement for a sequence of interactions providing a desired service to a user of a mobile terminal, the arrangement comprising:
   a server for the service, the server being connected via a fixed network to a gateway providing an interface between the fixed network and a mobile network through which the mobile terminal is connected to the gateway;
   a start-up element situated in the gateway and configured to receive a signal for creating a macro for the sequence of interactions and to receive and check a request from the mobile terminal; and
   a replay element situated in the fixed network and configured to receive the request forwarded by the start-up element when the request contains a signal indicating that the macro is to be performed, to replay the macro for the desired service by loading the macro from a data repository and to send a response to be forwarded to the mobile terminal.

22. A method for a sequence of interactions providing a desired service to a user of a mobile terminal, which service is situated in a server for the service, the server being connected via a fixed network to a gateway, which performs an interface between the fixed network and a mobile network through which the mobile terminal is connected to the gateway, the method comprising:

- signaling from the mobile terminal to the start-up element in the gateway for creating a macro for the sequence of interactions;
- establishing a data structure for the macro in a data repository;
- recording by the start-up element the interactions for the macro;
- signaling from the mobile terminal to the start-up element for ending recording;
- storing the macro in the data repository;
- signaling from the mobile terminal to the start-up element for starting performing the macro;
- signaling from the start-up element to a replay element situated in the fixed network for starting performing the macro;
- loading the macro from the data repository to the replay element;
- constructing a request for the server;
- sending the request to the server;
- receiving a response from the server in the replay element for a next request repeating the constructing, the sending, and the receiving of a response, until a response for the final request is received; and
- sending a response for performing the macro to the start-up element to be forwarded to the mobile terminal.

23. A gateway for an interaction arrangement for a sequence of interactions providing a desired service to a user of a mobile terminal, the arrangement comprising:

- a server for the service, wherein the gateway
  provides an interface between a fixed network and a mobile network through which the mobile terminal is connected to the gateway,
  is connected via the fixed network to the server,
  is provided with a start-up element configured to receive a signal for creating a macro for the sequence of interactions, to receive and cheek a request from the mobile terminal and to record the macro,
  is configured to forward from the start-up element to a replay element situated in the fixed network a request containing a signal indicating that the macro is to be performed, wherein the replay element is configured to replay the macro for the desired service by loading the macro from a data repository,
  is configured to receive a response from the replay element, and
  is configured to forward the response to the mobile terminal.

24. A replay element for an interaction arrangement for a sequence of interactions providing a desired service to a user of a mobile terminal, the arrangement comprising a server for the service, the server being connected via a fixed network to a gateway, the gateway providing an interface between the fixed network and a mobile network through which the mobile terminal is connected to the gateway, wherein the replay element:

- is situated in the fixed network;
- is configured to receive a request forwarded by a start-up element, which start-up element is situated in the gateway and configured to receive a signal for creating a macro for the sequence of interactions and to receive and check a request from the mobile terminal;
- is configured to replay the macro for the desired service, when the request contains a signal indicating that the macro is to be performed, by loading the macro from a data repository; and
- is configured to send a response to the gateway be forwarded to the mobile terminal.

* * * * *